United States Patent
Brand

(10) Patent No.: US 6,212,510 B1
(45) Date of Patent: Apr. 3, 2001

(54) METHOD FOR MINIMIZING ENTROPY IN HIDDEN MARKOV MODELS OF PHYSICAL SIGNALS

(75) Inventor: Matthew E. Brand, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 09/016,375

(22) Filed: Jan. 30, 1998

(51) Int. Cl.$^7$ ................................ G06N 5/00; G06N 5/02
(52) U.S. Cl. ................................ 706/62; 706/49; 706/12; 706/14
(58) Field of Search .................. 706/12, 13, 15, 706/62

(56) References Cited

PUBLICATIONS

Tobin, D.M.; Maybeck, P.S., Enhancements to a multiple model adaptive estimator/image–tracker, Aerospace and Electronic Systems, IEEE Transactions on, vol.: 24 4 , Jul. 1988, pp. 417–.*

Jun Zhang, Parameter reduction for the compound Gauss–Markov model, Image Processing, IEEE Transactions on, vol.: 4 3 , Mar. 1995, pp. 382–386.*

Wheeler, M.D.; Ikeuchi, K., Sensor modeling, probabilistic hypothesis generation, and robust localization for object recognition, CAD–Based Vision Workshop, 1994., Proceedings of the 1994, Second , 1994 , pp. 46–53, Jul. 1998.*

Hanson, K.M.; Myers, K.J., Performance of the Rayleigh task based on the posterior probability of tomographic reconstructions, Nuclear Science Symposium and Medical Imaging Conference, 1991., Conference Record of the 1991 IEEE , Nov. 2–9, 1991 , pp. 2.

Radu Marculescu, Diana Marculescu and Massoud Pedram; Composite sequence compaction for finite–state machines using block entropy and high–order Markov models; Proceedings fo the 1997 international symposium on Low power electronics and design, Aug. 18, 1997.

James A. Whittaker and J. H. Poore; Markov analysis of software specifications; ACM Trans. Softw. Eng. Methodol. 2, 1 (Jan. 1993), pp. 93–106.

Brand, Matthew, JP11259643 A, Japan, Sep. 24, 1999, Action Detection System, Nov. 1991.

* cited by examiner

*Primary Examiner*—Mark R. Powell
*Assistant Examiner*—Wilbert Starks
(74) *Attorney, Agent, or Firm*—Dirk Brinkman

(57) ABSTRACT

A system which observes the world through a video camera and/or other sensors, automatically learns a probabilistic model of normative behavior through the use of a Hidden Markov Model, and uses that model to infer the kind of activity currently under view and detect unusual behavior. The use of hidden Markov models is made possible by entropic training of the model with an $\theta^\theta$ entropic estimator that folds structure learning into the parameter estimation process to remove parameters from the Hidden Markov Model which have little information content, thus to permit real time robust unusual behavior detection. In one embodiment, the system consists of three components: image analysis; model learning; and signal analysis. In image analysis, each frame of video is reduced to a vector of numbers which describe motion of objects in front of the camera, with a sequence of such vectors, one for each frame of video, establishing the "signal." In model learning, the signal is analyzed to obtain parameters for a probabilistic model of the dynamics of the scene in front of the camera. In signal analysis, the model is used to classify and/or detect anomalies in signals produced on-the-fly by image analysis of new video.

7 Claims, 10 Drawing Sheets

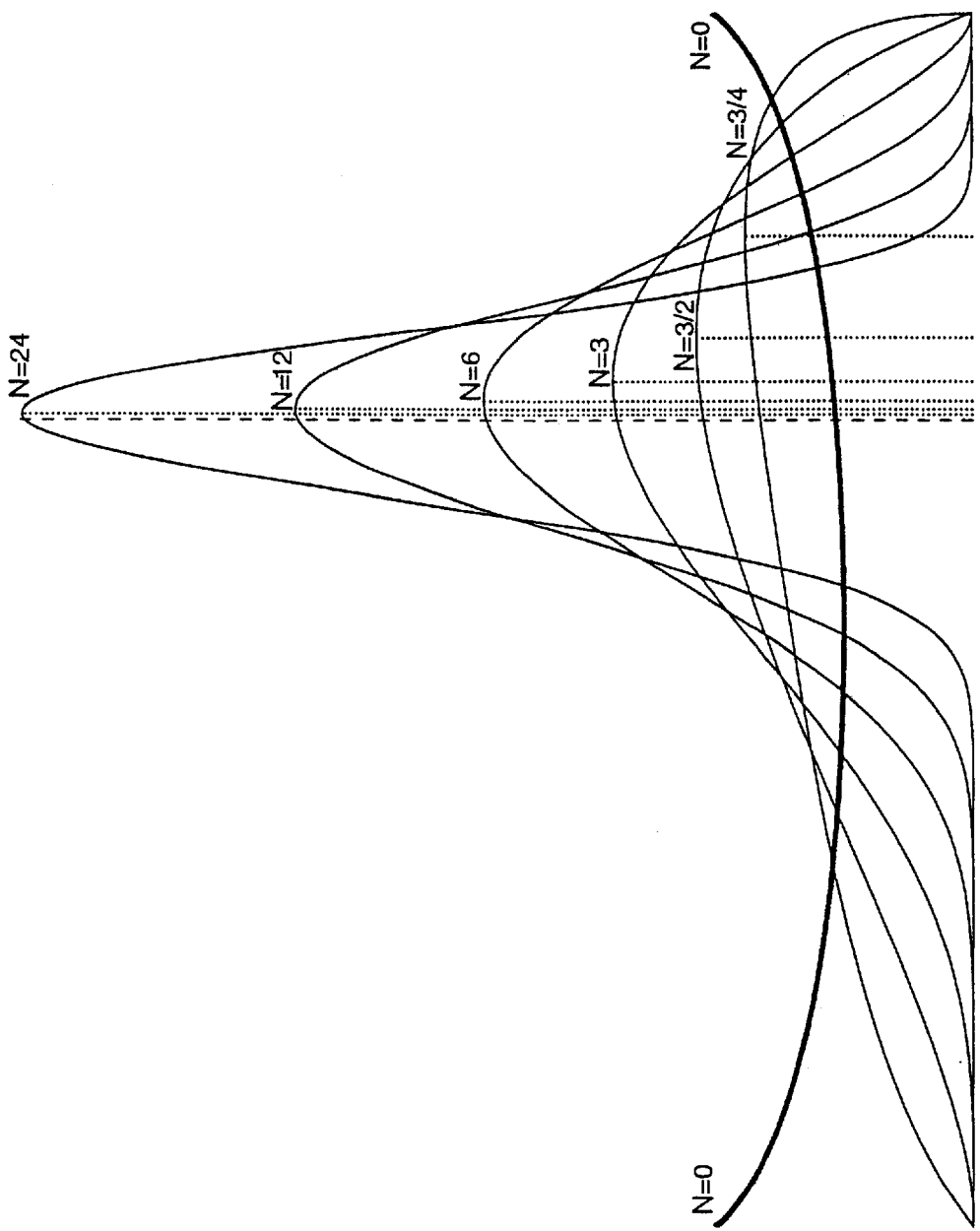

METHOD FOR MINIMIZING ENTROPY IN HIDDEN MARKOV MODELS OF PHYSICAL SIGNALS

FIELD OF THE INVENTION

This invention relates to the robust detection of normative behavior of an individual as detected by a video camera and more particularly to a system for detecting unusual human behavior through the use of real time video analysis of a scene using a hidden Markov model trained with an entropic prior.

BACKGROUND OF THE INVENTION

In the past, there has been considerable interest in detecting and classifying movement of individuals for time and motion studies, for security and for general monitoring purposes. The bulk of such monitoring systems require a priori knowledge so as to be able to detect preselected or predetermined behaviors. In these systems motion captured by a video camera is matched against histograms or other types of templates. However, all of these systems require some idea of normative behavior and the non-normative behavior sought to be detected in order to make the histograms or templates.

As a result, there is wide interest in learning normative models of activity from vision through the use of hidden Markov models. However their use results in unsatisfactory results due to exceedingly low accuracies.

Note that in an article entitled "Generation of semantic regions from image sequences," J. H. Fernyhough, A. G. Cohn, and D. C. Hogg have shown how to learn characteristic motion maps for pedestrian plazas, which are themselves representations of non-parametric distributions over collections of pedestrian trajectories. Their account can be found in European Conference on Computer Vision, 1996, volume 2, pages 475–484. Their models lack some of the important properties of the subject invention, notably concision and accurate recovery of the essential structure of the signal.

The literature of structure-learning in HMMs is, to date, based entirely on generate-and-test algorithms. These algorithms work by selecting a single state to be merged or split, then retraining the model to see if any advantage has been gained. Though these efforts use a variety of heuristic techniques and priors to avoid failures, much of the computation is squandered and reported run-times range from hours to days. Andreas Stolcke and Stephen Omohundro detail a merging algorithm in "Best-first model merging for hidden Markov model induction," International Commputer Science Institute Technical Report 94-003, University of California Berkeley, April 1994. Shiro Ikeda details a splitting algorithm in "Construction of Phoneme Models—Model Search of Hidden Markov Models," proceedings of the International workshop on Intelligent Signal Processing and Communication Systems, Sendai, October 1993.

Hidden Markov models are widely used for modeling and classifying signals. The Baum-Welch algorithm efficiently estimates maximum likelihood, ML, parameters, but the user is obliged to specify the graphical structure of the model. Typically the user makes several guesses at the state count and transition topology; testing each guess is computationally intensive.

The process is tedious but necessary. Since structure is the primary determinant of a model's selectivity and speed of computation.

SUMMARY OF THE INVENTION

In the subject invention, motion is classified using a hidden Markov model, the accuracy of which is greatly improved through the use of structure learning that is folded into the parameter estimation process in the form of $\theta^e$. The result of using the entropic prior is to trim the hidden Markov model in a way not heretofore possible to eliminate or remove parameters which have little information content. Not only is accuracy improved enough to achieve a robust system, processing times are greatly reduced.

In one embodiment, the entropic prior is introduced over multinomials which favors parameters with large dynamic ranges, meaning strong odds. Iterative maximum a posteriori, MAP, estimation using this prior produces parameter values such that uninformative parameters are driven toward extinction. When applied to HMM training, the resulting models are topologically simpler and show superior generalization. To amplify the parameter extinction process, the subject invention establishes when low conditional probabilities can be zeroed, wholly eliminating transitions. Finally, the subject invention determines how and when to delete unnecessary states.

Each transform removes the model from a local probability maximum, simplifies it, and opens it to further training. All operations are monotonic in posterior probability, so that training proceeds directly to a locally optimal structure and parameterization. All algorithms presented herein have the same computational complexity as conventional Baum-Welch reestimation, e.g., linear in the size of the data and linear in the number of transitions.

More specifically, an algorithm is provided for structure discovery in signals and is used to learn a normative theory about the behavior of the visual world from coarse image representations. The theory takes the form of the transition graph and receptive fields, e.g., continuous output distributions, of a Hidden Markov Model. The learning algorithm introduces and exploits and entropic prior in the form of $\theta^e$ for fast simultaneous structure and parameter estimation. In contrast to coventionally trained HMMs, the resulting model is so highly structured that it is intelligible to humans, and can be automatically converted into a flowchart and/or a map of characteristic activities such as motion patterns in the field of view.

In the subject invention, the system is one which learns a model of human behavior from medium-to-long-term ambient video. Desiderata for such a model include that the model should partition the visual data stream into coherent activities; that it should allow the detection of anomalous behaviors; and that it should be computationally lightweight. All of these criteria are met with the subject algorithm that learns low-entropy probabilistic finite-state models from a time-series of coarse image representations. Moreover, these models are often concise enough to be intelligible to humans.

Moreover, they are normative models of activity that are readable as flowcharts or as maps of characteristic activities such as motion patterns in the field of view.

The key to this result is a new expectation-maximization, EM, algorithm for simultaneous structure and parameter learning in Hidden Markov Models.

The algorithm finds a low-entropy representation of the hidden structure of a signal by trimming uninformative edges from the state transition graph and sometimes removes entire states. The basis of the algorithm is an entropic prior on the HMM parameter values in the form of $\theta^\Theta$ and a solution for the MAP estimate. As will be shown, the MAP estimate minimizes the entropy of the model and its cross-entropy with the data's sufficient statistics. By data's sufficient statistics is meant the fraction of times that each different kind of event occurs in the data. Iterative estimation tends to extinguish uninformative parameters, which can the be trimmed from the model. This yields a concise and computationally lightweight model. In practice, surviving states tend to be highly correlated with meaningful partitions of the data, while surviving transitions provide a least ambiguous model of the signal dynamics.

More specifically, the subject system observes the world through a video camera and/or other sensors, automatically learns a probabilistic model of normative behavior through the use of a Hidden Markov Model, and uses that model to infer the kind of activity currently under view and detect unusual behavior. The use of hidden Markov models is made possible by entropic training of the model with an $\theta^\Theta$ entropic trainer that folds structure learning into the parameter estimation process for the Hidden Markov Model to remove parameters from the Hidden Markov Model which have little information content. This permits real time robust unusual behavior detection. In one embodiment, the system consists of three components: image analysis; model learning; and signal analysis. In image analysis, each frame of video is reduced to a vector of numbers which describe motion of objects in front of the camera, with a sequence of such vectors, one for each frame of video, establishing the signal. In model learning, the signal is analyzed to obtain parameters for a probabilistic model of the dynamics of the scene in front of the camera. In signal analysis, the model is used to classify and/or detect anomalies in signals produced on-the-fly by image analysis of new video.

Image analysis begins by proceeds by identifying active pixels in each frame of video. Active pixels have a high probability of belonging to a moving surface in the world. The mechanism that classifies pixels is based on a statistical model of how pixel values change with motion. It adapts to camera noise and changes in lighting, two significant problems for computer vision. The system groups the active pixels and computes a description of their cumulative shape. Two descriptions that work well are first and second order moments of active pixels' (x,y) locations; and separate histograms of their x, y, x+y, x−y locations. It is important to note that the system can flexibly use many kinds of signals that can be extracted from many kinds of sensors. For example, information describing color, sound, or alternative motion features can be incorporated into the signal and exploited by the signal model.

The model used for signal learning and analysis is the aforementioned Hidden Markov Model. The subject system introduces a new training procedure for hidden Markov models. Like many existing training procedures, it maximizes the fit between the model and the signal, known as the likelihood. Unlike all known training procedures, it also minimizes the size of the model. This results in smaller, faster models that generalize and classify better. The training algorithm works by removing parameters from the model that have little information content, much as Occam's razor trims scientific theories down to the minimal formulae with the greatest predictive power. Were these uninformative parameters left in, the model would not only learn the dynamics of the training signal, but also its accidental quirks and peculiarities. This is called overfitting, and it often causes learned models to perform poorly when presented with new signals.

Not only does trimming protect against overfitting, but it also makes the model so well structured that it is possible to do something new with hidden Markov models: discover distinct activities within the dynamics of the signal. For example, while learning a video signal derived from surveying an office scene, in one embodiment, the system discovers that there are four different kinds of motion that correspond to phone conversations, working at the whiteboard, working at the computer, and relaxing in the desk chair. After learning, it can detect these activities, and this information can be used, for example, to helpfully adapt the office environment, e.g., dimming lights for computing, reducing noise for phone conversations, etc. In addition, these models do a very good job of detecting unusual behavior that might indicate illness, agitation, or the intrusions of a stranger.

BRIEF DESCRIPTION OF THE DRAWINGS

These and other features of the subject invention will be better understood with reference to the Detailed Description in conjunction with the Drawings, of which:

FIG. 5 is a graph showing the exaggeration of odds performed by the entropic maximum a posteriori estimator, which is the result of applying the $\theta^\Theta$ prior to evidence observed;

DETAILED DESCRIPTION

Figure 1A:
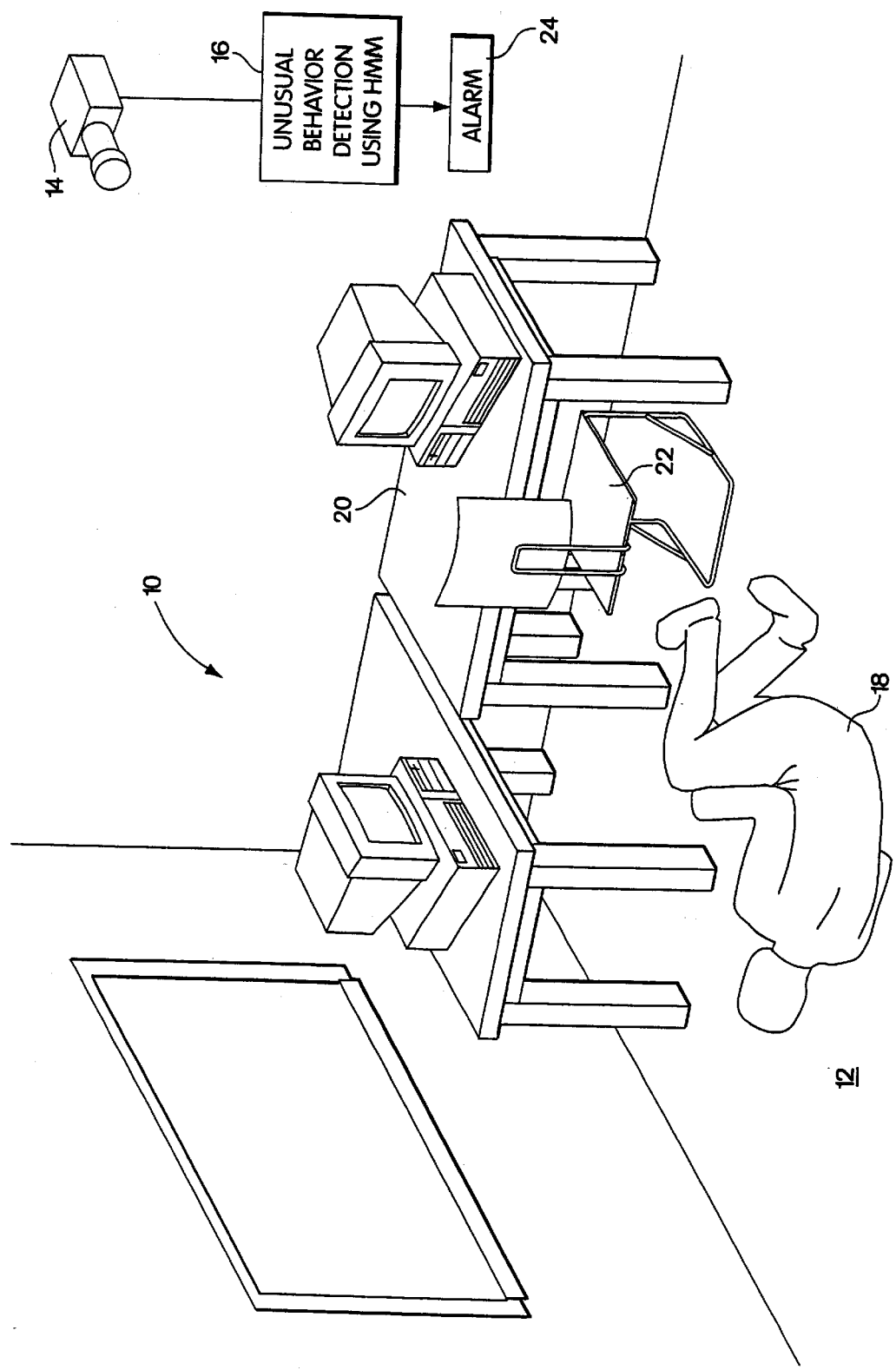
FIG. 1A is a diagrammatic representation of a scene including office furniture and an individual who is apparently suffering from an epileptic fit, with the scene being surveyed by a video camera, the output of which is used to determine unusual human behavior using a hidden Markov model.

Referring now to FIG. 1A, what is depicted as a seen involving a room 12 in view of a video camera 14, which is coupled to a unit 16 which detects unusual behavior of an individual 18 within room 12 utilizing a hidden Markov model. As can be seen the individual is depicted lying on the floor of the room in front of his desk 20, apparently in distress as would be the case, for instance, if the individual were experiencing an epileptic seizure. The fact of his movement, presumably from chair 22 to the ground is detected by unit 16 and an alarm or other indication is made via alarm 24.

The ability to detect non-normative behavior is a result of utilizing a hidden Markov model which is trained using the aforementioned antropic prior. It is a feature of hidden Markov models that a signal is examined for normative properties over a period of time, and with the normative properties ascertained, unusual behavior can be detected.

Figure 1B:
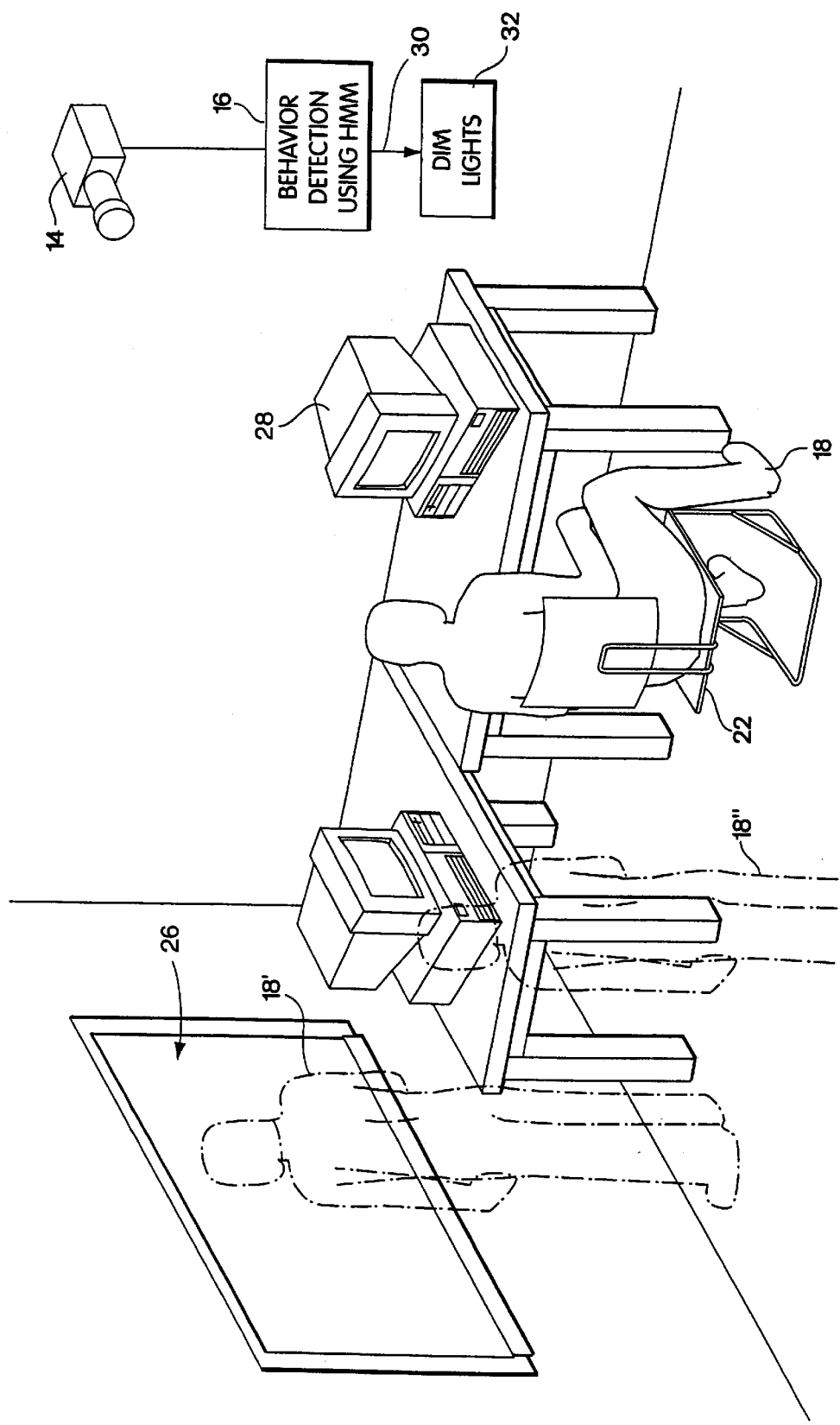
FIG. 1B is a diagrammatic illustration of the scene of FIG. 1A illustrating the position of an individual at a whiteboard, standing in the room, and seated at a computer terminal, with the video camera and the hidden Markov model detecting which activity the individual is participating in and dimming the lights when the individual is detected at work in front of the computer.

Referring now to FIG. 1B, individual 18 is shown seated at chair 22 and, as illustrated by dotted outline 18, standing in front of a white board 26. Individual 18 is also shown in dotted outline standing in room 12 as if he had entered the room as illustrated at 18.

It will be appreciated that all of the activity or motion in room 12 is surveyed by camera 14, and with the training of the hidden Markov model, various behaviors can be categorized at 16 so that rather than the behavior being unusual, various usual normative behaviors can be classified utilizing the hidden Markov model trained through the utilization of the antropic prior mentioned above. In this case, individual 18 is detected as seated in front of his computer 28, with a resulting signal as indicated by arrow 30 being applied by a unit 32 to, for instance, dim the lights in the room 12.

Figure 2:
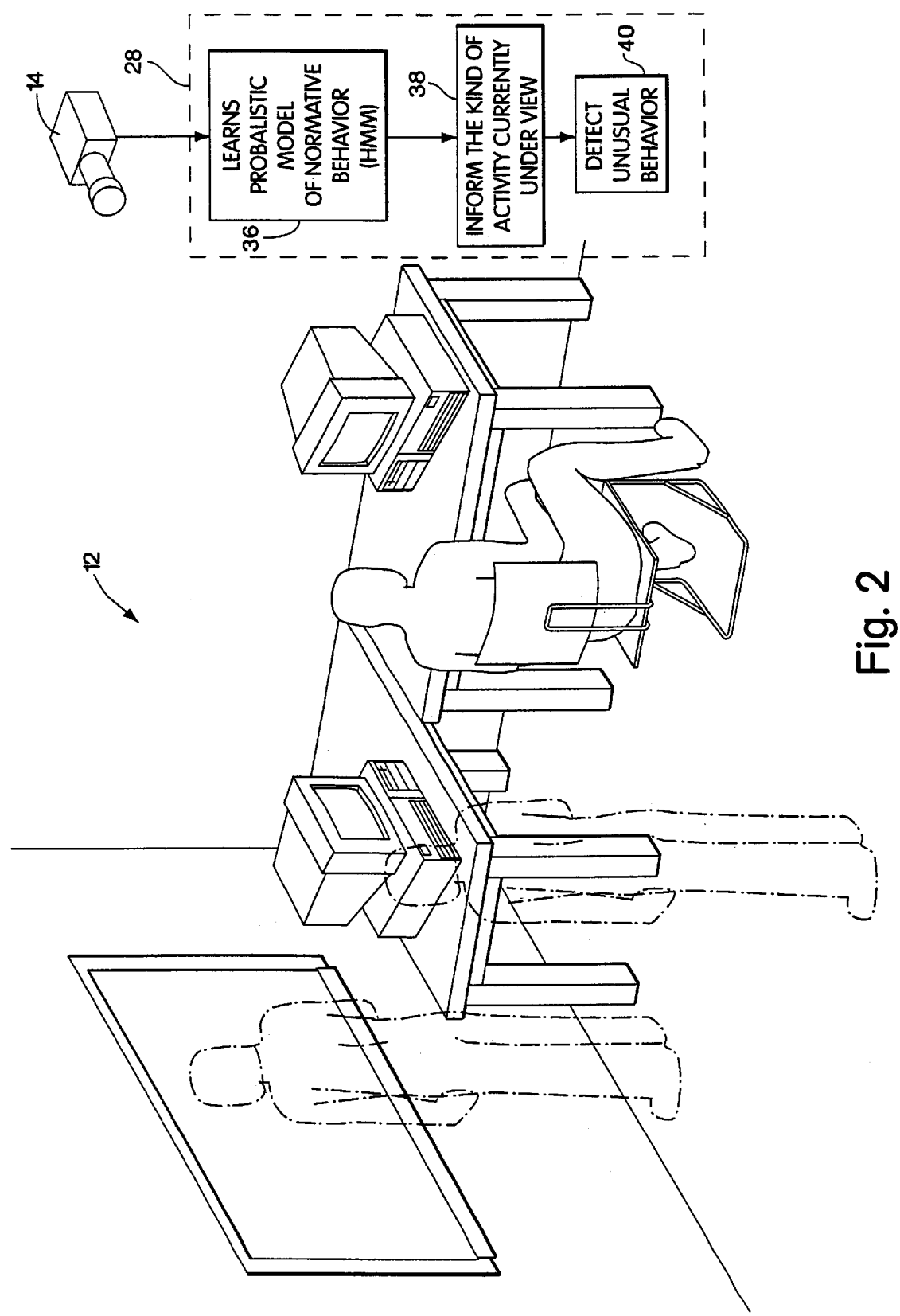
FIG. 2 is a diagrammatic representation of a scene illustrated in FIGS. 1A and 1B in which a probabilistic model of normative behavior is first learned through the use of the hidden Markov model, followed by identification of the kind of activity current under view, followed by the detection of unusual behavior, all from the probabilistic model.

Referring now to FIG. 2, scene 12 is analyzed in a series of steps illustrated by dotted box 28 which performs the functions of unit 16 in which the system first learns the probabilistic model of normative behavior as illustrated at 36 through the utilization of the entropic prior trained hidden Markov model. Thereafter, as illustrated by step 38, the particular activity currently under view is categorized whereby, as illustrated at 40, unusual behavior is detected.

Figure 3:
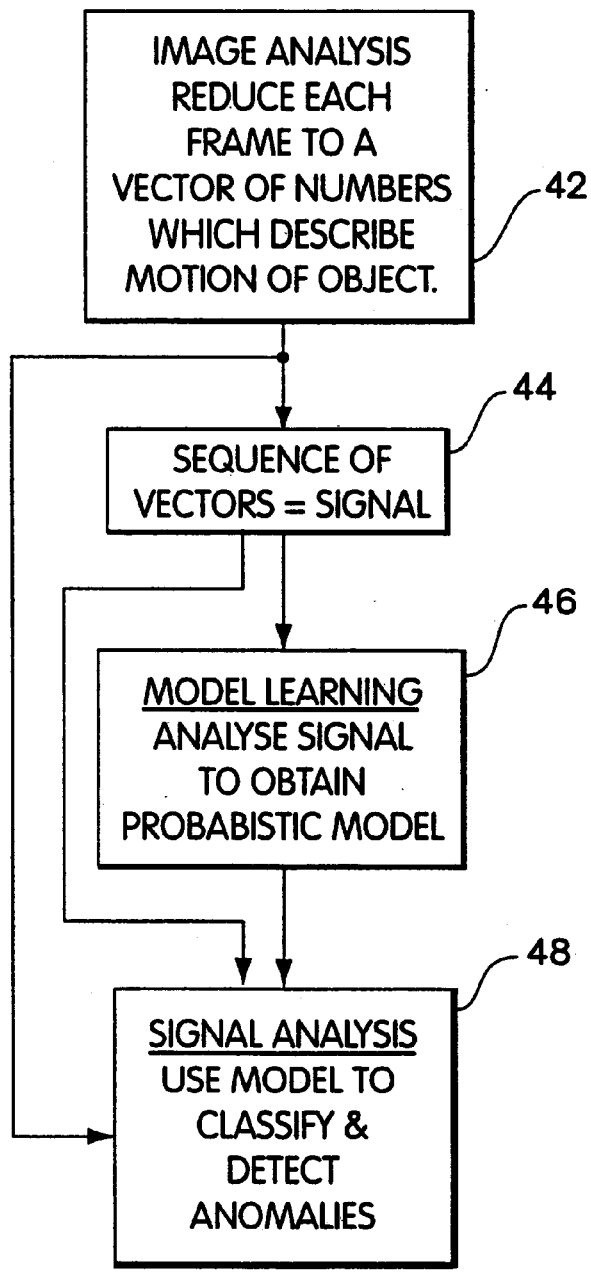
FIG. 3 is a block diagram of the sequence of events in the determination of behavior including image analysis, model learning, and signal analysis.

Referring now to FIG. 3, the learning of the probabilistic model first requires image analysis as illustrated at 42, in which the image is reduced, frame by frame to a vector of numbers which describes the motion of any object or pixel within the scene. The result, as illustrated at 44, is a sequence of vectors which constitutes the signal from which model learning is obtained. As illustrated at 46, model learning includes an analysis of the signal to obtain a probabilistic model through the utilization of the hidden Markov model algorithms. Upon having derived the probabilistic model, signal analysis, as illustrated at 48, is used to classify the motions in the scene and to detect anomalies. This is done on a real-time basis through the output of unit 42.

Figure 4:
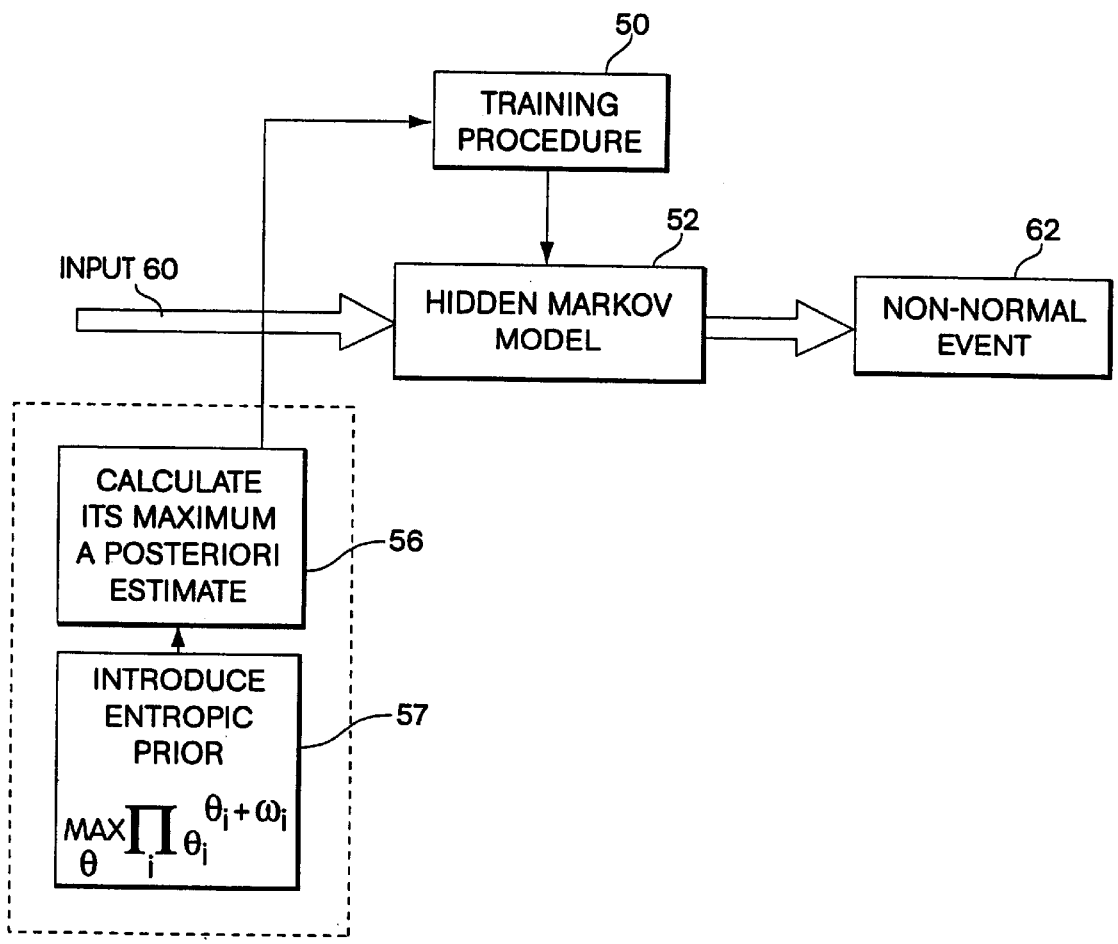
FIG. 4 is a block diagram of a system for identifying abnormal events through the introduction of an entropic prior having the form $\theta^\Theta$ which is then used in the calculation of its maximum a posteriori estimate, that is in turn used in the training procedure of the hidden Markov model.

Referring now to FIG. 4, the ability of the system to rapidly determine normative behaviors without a priori knowledge of what is considered normative is made possible through a training procedure 50 for hidden Markov model 52 which first involves the utilization of entropic prior 54 to be able to permit trimming of the parameters of the hidden Markov model by rejection of those events which are not of interest, meaning those events whose probability is neither zero or one, but rather lies in some indeterminent position therebetween. What is therefore used in the training of the Markov model are those events which either have a high probability of existing or virtually no probability of existing.

The entropic prior is introduced into the calculation of its maximum a posteriori estimate as illustrated at 56, which is directly used in training procedure 50 for the hidden Markov model.

In operation and once the hidden Markov model has been properly trained, input signal 60 is applied to the model with the output categorizing non-normal events as illustrated at 62.

By way of further background, here learning a model of human behavior from medium- to long-term ambient video is considered. Desiderata for such a model include: It should partition the visual data stream into coherent activities; it should allow the detection of anomalous behaviors; and it should be computationally lightweight. One finds that one can meet these criteria with a new algorithm that learns low-entropy probabilistic finite-state models from time-series of coarse image representations. Moreover, these models are often concise enough to be intelligible to humans. They are normative models of activity that are readable as flowcharts or as maps of characteristic activities, e.g., motion patterns, in the field of view.

The key to this result is a new expectation-maximization, EM, algorithm for simultaneous structure and parameter learning in hidden Markov models. The algorithm finds a low-entropy representation of the hidden structure of a signal by trimming uninformative edges from the state transition graph and sometimes removes entire states. The basis of the algorithm is an entropic prior on parameter values and a solution for the maximum a posteriori, MAP, estimate. The MAP estimate minimizes the entropy of the model and its cross-entropy with the data's sufficient statistics. Iterative estimation tends to extinguish uninformative parameters, which can the be trimmed from the model. This yields a concise and computationally lightweight model. In practice, surviving states tend to be highly correlated with meaningful partitions of the data, while surviving transitions provide a nearly minimal perplexity model of the signal dynamics.

In entropic estimation, one asserts that parameters that do not reduce uncertainty are improbable. Parameters at chance add no information to the model, and are therefore wasted degrees of freedom. Parameters near zero or one are informative because they impose strong constraints on the class of signals covered by the model. One can capture this intuition in an elegant form which has a simple relation to parameter entropy:

$$p_e(\theta_i) = \theta_i^{\theta_i} = e^{\theta_i \log \theta_i} = e^{-H(\theta_i)} \quad (1)$$

$$p_e(\theta) = \prod_{\theta_i \in \theta} \theta_i^{\theta_i} \quad (2)$$

The entropic prior has two maxima, at 0 and at 1. Consequently, it favors models with low levels of ambiguity and with large numbers of parameters turned off, e.g., set to zero. Referring to FIG. 5 the curves shown indicate the effect of using the entropic prior to bias the system to assign probabilities such that if there is little evidence to base a decision on, the system prefers very strong odds. For example, the peaks of the curves in FIG. 5 show the best odds given evidence for two kinds of events, A and B, such that A occurs twice as often as B. When many such events have been observed, the estimated parameter does indeed converge to $2/3$, the fair probability of A happening. On the other hand, when very few events have been observed, the system cannot trust the data and prefers to skew its estimates in favor of a higher probability for event type A. The low bolded curve shows that the prior prefers 0 or 1 in the absence of any evidence.

Thus, the use of $\theta^\theta$ forces any learning algorithm to simplify the model, pushing parameter values toward 0 or 1. It can be proven that $\theta^\theta$ is the optimal mathematical form of Occam's razor. A model is a theory of the data, one which describes it regularities and structure. Using $\theta^\theta$ strikes the perfect balance between, on the one hand, having a theory that is too simple and fails to capture all of essential information in the data, and, on the other hand, having a theory that is too complex and describes the accidental properties of the data, which are to be avoided.

Informally, the prior says that it is better to have strong opinions that are later moderated by experience; one's correct predictions garner more credibility and one's incorrect predictions provide more diagnostic information for learning.

Figure 6A:
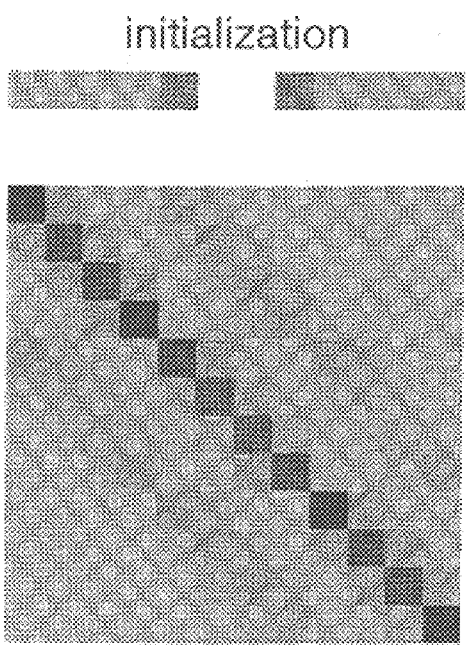
FIG. 6A is a depiction of a hidden Markov model parameter matrix before training.
Figure 6B:
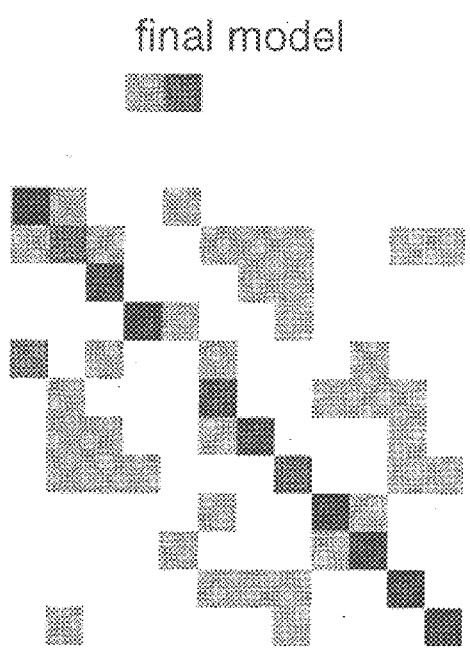
FIG. 6B is a depiction of a hidden Markov model parameter matrix of FIG. 6A after training with the entropic estimator, illustrating the elimination of excess parameters, which would otherwise be a source of error.

The above use of $\theta^\theta$ permits trimming of excess parameters from any probabilistic model, as will be seen later in connection with FIGS. 6A, 6B, 6C.

More specifically, the convex curve in FIG. 5 shows how this prior is averse to chance values and favors the 0, 1 extremes. For 2-parameter multinomials the minimum is at $\frac{1}{2}$; for 3-parameter, $\frac{1}{3}$; etc. Combining this with the multinomial yields the biased entropic prior:

$$p_e(\theta \mid \omega) \propto p_e(\theta) \prod_i^N \theta_i^{\omega_i} = \prod_i^N \theta_i^{\theta_i + \omega_i} \quad (3)$$

where $\omega_i$ is a bias for event type i.

This prior is obviously conjugate to the multinomial, so we may also consider $\omega$ to be evidence, in which case the posterior takes the same form as eqn. 3. As FIG. 5 shows, with scant evidence this distribution skews to stronger odds, but with increasing evidence it converges to "fair" odds for $\omega$. Note that this is the opposite behavior that one obtains from a Dirichlet prior, which skews to weaker odds when data is scarce.

Having introduced the entropic prior, one now has to generate MAP estimates used in training probability models.

To obtain MAP estimates we set the derivative of log-likelihood to zero, using Lagrange multipliers to ensure $\Sigma_i \theta_i = 1$, $$0 = \frac{\partial}{\partial \theta_i} \left( \log \prod_i^N \theta_i^{\omega_i + \theta_i} + \lambda \sum_i^N \theta_i \right) \quad (4)$$

$$= \sum_i^N \frac{\partial}{\partial \theta_i} (\omega_i + \theta_i) \log \theta_i + \lambda \sum_i^N \frac{\partial}{\partial \theta_i} \theta_i$$

$$= 1 + \frac{\omega_i}{\theta_i} + \log \theta_i + \lambda \quad (5)$$

Solving for $\theta_i$ yields $$\theta_i = \frac{-\omega_i}{W_{-1}(-e^{\lambda + 1 + \log \omega_i})} \quad (6)$$

where $W_{-1}$ is the secondary branch of Lambert's W function, a multivalued solution to $W(\chi)e^{W(\chi)} = \chi$. Equations 5 and 6 yield a fast iterative procedure for the entropic MAP estimate: Calculate $\theta$ given $\lambda$, normalize $\theta$, calculate $\lambda$ given $\theta$, repeat. This typically converges in 2–3 iterations.

Some manipulation of the logarithm of eqn. 3 allows us to understand the MAP estimate in terms of entropy:

$$\log \prod_i^N \theta_i^{\theta_i + \omega_i} = \sum_i^N (\theta_i + \omega_i) \log \theta_i \quad (7)$$

$$= \sum_i^N (\theta_i \log \theta_i + \omega_i \log \theta_i - \omega_i \log \omega_i + \omega_i \log \omega_i)$$

$$= \sum_i^N \theta_i \log \theta_i - \sum_i^N \omega_i \log \frac{\omega_i}{\theta_i} + \sum_i^N \omega_i \log \omega_i$$

$$= -H(\theta) - D(\omega \| \theta) - H(\omega) \quad (8)$$

Thus the MAP estimate minimizes the sum of the parameter entropy $H(\theta)$ and the cross-entropy $D(\omega \| \theta)$ between the parameters $\theta$ and the data's sufficient statistics $\omega$.

Entropic estimation drives parameter values asymptotically toward zero, with some parameters actually reaching extinction because of a redistribution of evidence as the model structure changes, or because of numerical round-off. Zeros are very desirable because they reduce the ambiguity and computational complexity of the model. One can explicitly force a parameter $\theta_i$ to extinction without loss of probability mass by detecting when the loss of likelihood $p(X|\theta \setminus \theta_i)$ is balance by the gain in the prior $p(\theta \setminus \theta_i)$, e.g., $$\frac{p(\theta \setminus \theta_i)}{p(\theta)} \geq \frac{p(X \setminus \theta)}{p(X \mid \theta \setminus \theta_i)} \quad (9)$$

We substitute in the prior and take logarithms:

$$\log \frac{1}{\theta_i^{\theta_i}} \geq \log p(X \mid \theta) - \log p(X \mid \theta \setminus \theta_i) \quad (10)$$

If $\theta_i$ is small we can substitute a differential into the right hand side:

$$-\theta_i \log \theta_i \geq \theta_i \frac{\partial \log p(X \mid \theta)}{\partial \theta_i} \quad (11)$$

Dividing by $-\theta_i$ and exponentiating, we obtain $$\theta_i \leq \exp\left[ -\frac{\partial \log p(X \mid \theta)}{\partial \theta_i} \right] \quad (12)$$

So $\theta_i$ must be very small indeed, since the gradient of the log-likelihood can be quite large. However, entropic estimation brings many or most parameter values within trimming range.

Having developed the entropic prior, its MAP estimator, and the trimming operation, these can now be applied to the training of hidden Markov models.

In entropic estimation of HMM transition probabilities, one uses the probability mass for each transition as evidence:

$$\gamma_{j,i} = \sum_{t}^{T-1} \alpha_j(i) P_{i|j} p(y_{t+1} | s_i) \beta_i(t+1) \quad (13)$$

where $\alpha, \beta$ are obtained from forward-backward analysis as per Rabiner's description in "A tutorial on hidden Markov models and selected applications in speech recognition," Proceedings of the IEEE, volume 77, number 2, pages 257–286, 1989. One calculates new estimates $\{\hat{P}_{i|j}\}_i = \theta$ by applying the MAP estimator to each $\omega = \{\gamma_{j,i}\}_i$. By contrast, in Baum-Welch reestimation, one simply sets $\hat{P}_{i|j} = \gamma_{j,i}/\Sigma_i \gamma_{j,i}$.

Entropic training has a number of interesting properties: (1) Smaller transition probabilities are driven toward zero, at which point the entire transition can be deleted from the model, reducing compute time and ambiguity. (2) State output distributions tend to have tighter covariances and states are more clearly identified with regions of the signal. (3) Entropically trained HMMs tend to have higher posterior probabilities given held out test data than conventionally trained HMMs, and thus classify more accurately. (4) Entropically trained HMMs tend to attain the same low perplexity regardless of initial conditions, while the perplexity of conventionally trained HMMs is a function of their initial state count.

Following the development of trimming, it can be shown that in HMMs the parameters remaining near zero can also be deleted with no loss of probability mass if and only if $$P_{i|j} \le \exp\left(-1 - \sum_{t=1}^{T-1} \gamma_j(t)\right) \quad (14)$$

where $\gamma_j(t)$ is the probability of state j at time t. This bumps the model out of a local probability maximum and allows further training. A similar test licenses state deletion, however, entropic training naturally reserves some excess states for representing common subpaths in the transition graph; this reduces the coding length and computational expense of the model. As used herein, these states are referred to as gating as opposed to data-modeling states because their output probabilities are near-zero almost everywhere and typically do not need to be computed.

Having developed the theory of operation of the subject system, its use may be applied to learning a model of office activity as described in FIGS. 1–4. As used herein, the terms output distribution and receptive field are used interchangeably, since both refer to regions of the signal to which a state is tuned.

Entropically trained HMMs typically provide superior performance in simple gesture recognition tasks. However, because of their facility for discovering concise structural models, one may also use them to learn the structure of longer term behavior. For example, how individuals behave in predestrian plazas, traffic intersections, factory floors, animal colonies, etc., are domains of interest. Office activity is a particularly good test because of the challenging range of time spans: Fast events such as picking up the phone take just a half-second while other activities such as writing take hours. The results below show that much of this structure can be discovered via lightweight, coarse visual tracking.

As to image representation, HMMs require a reasonably short short observation vector which represents the content of each image. Different image representations will lead to models that emphasize different coherencies in the data. Experiments were performed with two kinds of observation vectors: a stripe' representation and a blob representation. Stripe data consists of mean location and mean extent of active pixels in a vertical or horizontal stripe across the image. Blob data consists of ellipse parameters fitting the single largest connected set of active pixels in the image.

In both cases active pixels are identified by acquiring a static statistical model of the background texture and adaptive gaussian color/location models of the foreground, meaning pixels that have changed, ostensibly due to motion. Pixels are sorted into foreground or background according by likelihood ratio; morphological dilation connects the foreground pixels using a seed from the previous frame, as described in the paper by C. Wren, A. Azarbayejani, T. Darrell, and A. Pentland, "Pfinder: Real-time tracking of the human body," published in the Proceedings of the SPIE, volume 2615, 1995. For stripe data 5–10 stripes were used in each direction; the observation vector consisted of [mean, extent, $\Delta$mean, $\Delta$extent] for each stripe. For blob data a single ellipse was fitted the active pixels; the observation vector consisted of [$mean_x$, $mean_y$, $\Delta mean_x$, $\Delta mean_y$, mass, $\Delta$mass, elongation, eccentricity].

Approximately 30 minutes of data were taken at 4 Hz from an SGI IndyCam; after automatic deletion of blank frames when the subject exits the room and field of view, roughly 21 minutes of training data remained.

As might be expected, models built on blob data had receptive fields tuned primarily to location, motion, and gross shape; models built on stripe data were also sensitive to body articulations, e.g., having one's arm out to write on a whiteboard or pick up a phone. In both cases the results were similar; for the remainder of the paper we will concentrate on the blob data since the results lend themselves to clear visualizations.

As to training, three sequences ranging from 100 to 1900 frames in length were used for entropic training of 12, 16, 20, 25, and 30-state HMMs. States were initialized to tile the image with their receptive fields. Transition probabilities were initialized to prefer motion to adjoining tiles; first-state probabilities were set to zero for non-edge states. This is depicted in FIG. 6A, where the darker squares indicate larger values in the parameter matrix and lighter squares indicate near-zero values. It was found that variation in the initial receptive fields or state counts made little difference in the gross structure or performance of the final model. Training took six seconds on an SGI R10000 running Matlab.

Figure 8A:
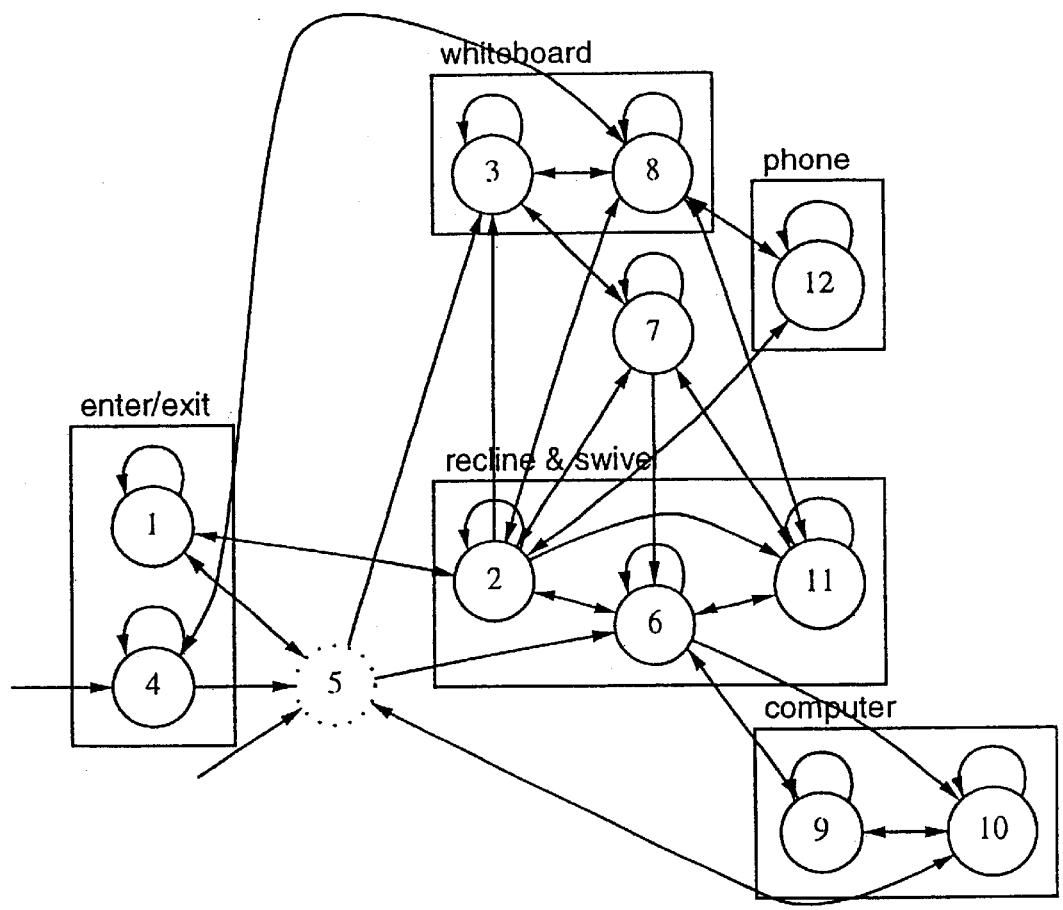
FIG. 8A is a flowchart generated from the hidden Markov model transition matrix in FIG. 6C, showing that all states or nodes remain connected via arcs to each other when entropic training is not used.
Figure 8B:
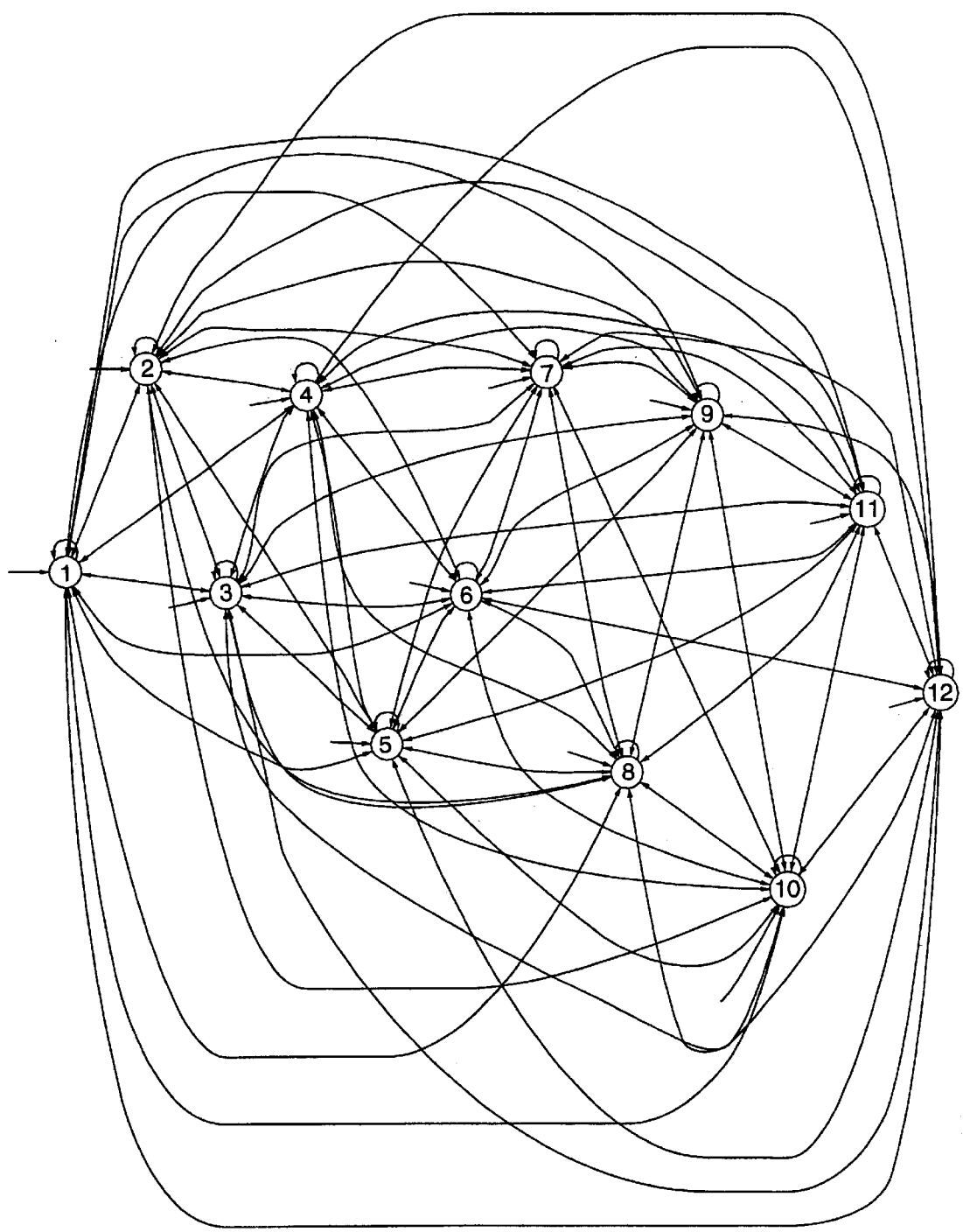
FIG. 8B is a flowchart generated from the entropically trained hidden Markov model illustrating the temporal structure of the activities are of the individual of the scene of FIGS. 1A and 1B, in which many of the arcs that were originally in the model have been deleted from the full set of arcs which had connected every node to every other node.

The results of the these experiments are are follows. Entropic training yields a substantially simplified parameter matrix, as shown in FIG. 6B. This is easily converted into a highly readable and interpretable representation of characteristic office activity in terms of a flowchart or finite-state machine. FIG. 8A shows this flowchart and the relations between its states and areas of the office. Note that finite-state machine of FIG. 8A shows that entropic training has discovered the essential activities and that they are only selectively connected, because unimportant arcs have been removed. This can readily be seen from FIG. 8B which is the result absent entropic training. Some states deserve special explanation: State 5 is a gating state that does not model data but simplifies paths between other states; state 7 responds mainly to elongation and represents getting up and sitting down; state 10 represents staring at the screen; state 9 represents looking down to and up from the keyboard.

Figure 6C:
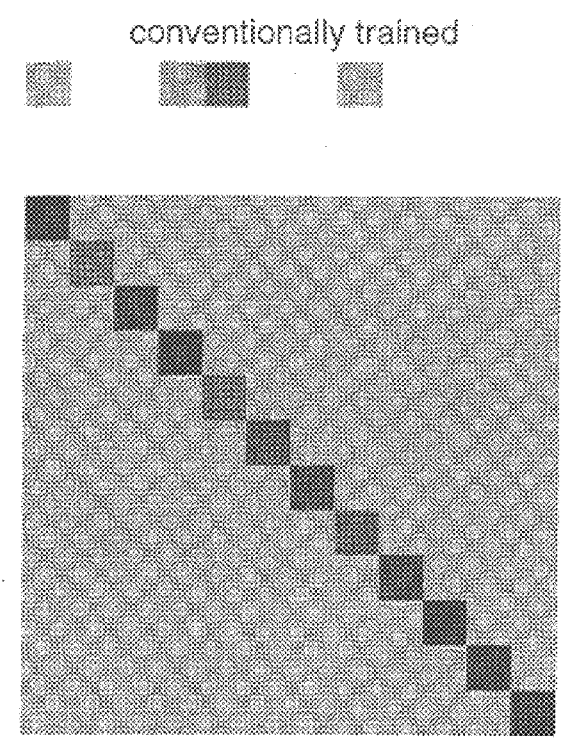
FIG. 6C is a depiction of a hidden Markov model parameter matrix of FIG. 6A after training without use of the entropic estimator, illustrating how excess parameters are left in the model.

Conventional training, by contrast, does not produce interpretable models with sparse transition graphs as can be seen in the dense parameter matrix in FIG. 6C. Conventional training fails to discover a structured model, though hints of the the entropic model are faintly visible. The equivalent finite-state machine, shown in FIG. 8B, as mentioned above, is totally unreadable.

Note that most of the transitions were trimmed, and many of the transitions are reversible, since many office activities have symmetric transitions, e.g., going to and from the whiteboard. Even though 12 states is probably suboptimal, one state was reserved for gating rather than data-modeling.

Figure 7:
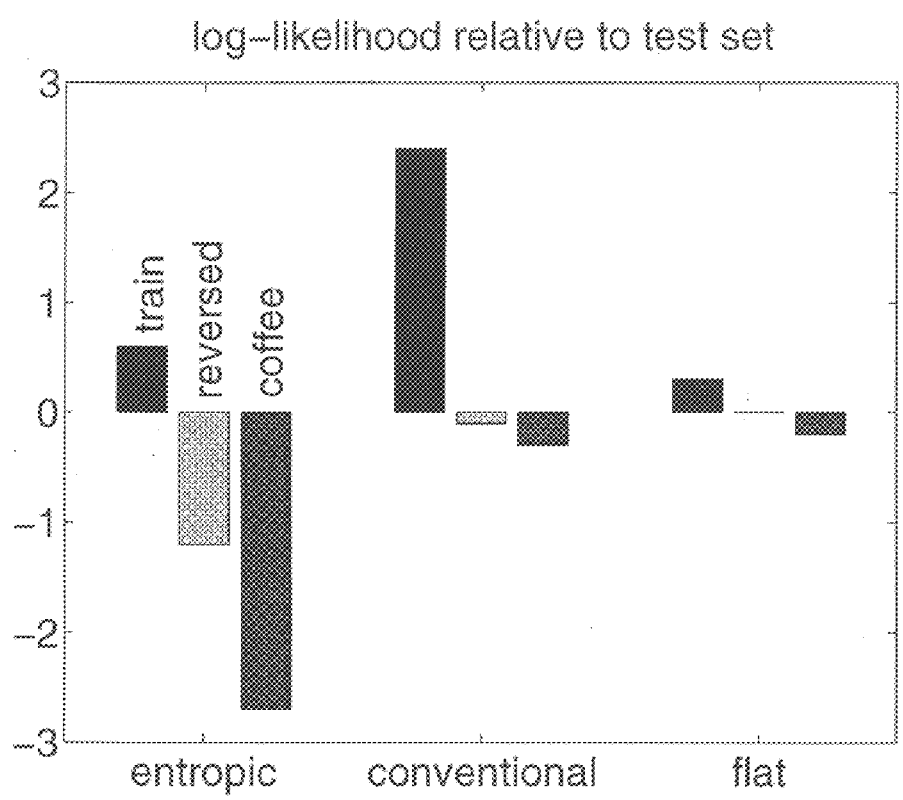
FIG. 7 is a chart showing that the entropically trained hidden Markov model does a better job of detecting anomalous signal than the conventionally trained hidden Markov model.

The ability of the model to detect unusual behavior was tested under several conditions to study the significance of the entropically trained transitions. Four data sets were used: (a) training data; (b) held out test data; (c) reversed held out test data; (d) data taken after the subject had consumed 4 cups of espresso. These data sets differ principally in the ordering, rhythm, and timing of actions, and therefore emphasize the discriminative power of the transition parameters. There were three test conditions: (1) entropically estimated parameters; (2) conventionally estimated parameters; (3) transition parameters flattened to chance. Condition (3) tests whether the transitions or output parameters are responsible for the model's selectivity. FIG. 7 shows that the entropic HMM generalized better to test data and was most successful in distinguishing abnormal behavior, e.g., backwards and jittery. The performance of the flattened model shows that little of that selectivity is due just to the output parameters.

In summary, what has been shown is how the computer 28 can form concise theories of behavior from large amounts of video using extremely coarse representations of change in the image. Given a half-hour of ambient video of office activity, the system generates a probabilistic model of normative activity, a readable flow-chart of work activities, and a map of significant events and processes in the field of view. The key to this result is an algorithm that exploits an entropic prior to do simultaneous structure and parameter estimation for HMMs. The expectation-maximization algorithm simultaneously minimizes the entropy of the model and its cross-entropy with the data; can escape local probability maxima through model simplifications; is monotonic; and converges in seconds. As a result, the entire system can learn or monitor the behavior of its environment using less than one-fourth of a modern workstation's compute power.

Having now described a few of the embodiments of the invention, and some modifications and variations thereto, it should be apparent to those skilled in the art that the foregoing is merely illustrative and not limiting, having been presented by the way of example only. Numerous modifications and other embodiments are within the scope of on of ordinary skill in the art and are contemplated as falling within the scope of the invention as limited only by the appended claims and equivalents thereto.

What is claimed is:

1. A computer implemented method for modeling a behavior of a signal, comprising the steps of:

reducing a training signal to a sequence of vectors;

storing the sequence of vectors in a memory as a hidden Markov model including states and state transitions;

providing an entropic prior probability; and estimating maximum a posteriori probability parameters of the stored hidden Markov model using the entropic prior probability to retain states and state transitions indicative of a normative behavior of the training signal resulting in a low entropy hidden Markov model stored in the memory.

2. The method of claim 1 wherein the entropic prior probability has a minimum at zero and a maximum, and further comprising the steps of:

gradually forcing the entropic prior probability to either zero or one; and discarding states and state transitions having a probability substantially close to zero.

3. The method of claim 1 further comprising:

providing an observation signal;

evaluating the observation signal with the low entropy hidden Markov model;

generating an alarm signal when the low entropy hidden Markov model evaluates the observation signal as having substantially low probabilities.

4. The method of claim 3 wherein the training signal and the observation signal each is a video sequence including a plurality of frames.

5. The method of claim 1 wherein the estimating step further comprises the step of:

setting a derivative of a log-posterior probability to zero, the log-posterior probability being derived from a likelihood function of the hidden Markov model and the entropic prior probability.

6. The method of claim 1 wherein the training signal is a video sequence of a scene, and the video includes a plurality of frames, and the vectors are motion vectors of pixel movement in the frames, and the normative behavior is a normative behavior in the scene.

7. The method of claim 6 further comprising the steps of:

determining first and second order moments of the pixel movement; and determining histograms of the pixel movement.

* * * * *